(12) United States Patent
Kaufman et al.

(10) Patent No.: US 10,394,646 B1
(45) Date of Patent: Aug. 27, 2019

(54) INCREMENTAL DATA VALIDATION

(71) Applicant: EMC IP Holding Company LLC, Hopkinton, MA (US)

(72) Inventors: Charles W. Kaufman, Redmond, WA (US); Radia J. Perlman, Redmond, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/984,749

(22) Filed: Dec. 30, 2015

(51) Int. Cl.
*G06F 11/10* (2006.01)
(52) U.S. Cl.
CPC ................ *G06F 11/1004* (2013.01)
(58) Field of Classification Search
CPC ... C12N 15/113; G06F 11/1004; G06F 17/30; G06K 9/00; G06K 9/38; G07C 13/00; H04L 29/06; C12Q 1/68; G06Q 20/38
See application file for complete search history.

(56) References Cited

U.S. PATENT DOCUMENTS

| | | | | |
|---|---|---|---|---|
| 5,226,148 A * | 7/1993 | Littlewood | ........... | G06F 17/273 707/999.005 |
| 9,537,657 B1 * | 1/2017 | Char | ..................... | H04L 9/3226 |
| 10,078,631 B2 * | 9/2018 | Bellegarda | ............ | G06F 17/276 |
| 2002/0191785 A1 * | 12/2002 | McBrearty | ................ | H04L 9/32 380/37 |
| 2006/0107178 A1 * | 5/2006 | Maciver | ................ | H03M 13/09 714/758 |
| 2009/0141895 A1 * | 6/2009 | Anderson | ............... | G06F 21/84 380/252 |
| 2011/0099351 A1 * | 4/2011 | Condict | ................ | G06F 3/0608 711/216 |
| 2012/0311345 A1 * | 12/2012 | Dhuse | ................. | G06F 21/6218 713/189 |
| 2014/0002363 A1 * | 1/2014 | Griffin | .................. | G06F 3/0237 345/168 |

* cited by examiner

*Primary Examiner* — Albert Decady
*Assistant Examiner* — Enamul M Kabir
(74) *Attorney, Agent, or Firm* — Muirhead and Saturnelli, LLC

(57) ABSTRACT

Described are techniques for performing data validation processing. An expected sequence of characters is determined that includes a plurality of groups. Each of the plurality of groups includes a first expected sequence of one or more characters representing encoded information and a second expected sequence of one or more data validation characters determined in accordance with a corresponding portion of the expected sequence. The portion includes at least the first expected sequence of one or more characters of the group. Data validation processing is incrementally performed as data for each of the plurality of groups is received. The data validation processing performed as data for each group is received uses a received sequence of one or more data validation characters corresponding to the second expected sequence of one or more data validation characters of each group.

18 Claims, 7 Drawing Sheets

| Index Value 332 | Base-32 encoded character 334 |
|---|---|
| 0 | A |
| .. | .. |
| 25 | Z |
| 26 | 0 |
| 27 | 1 |
| 28 | 2 |
| 29 | 3 |
| 30 | 4 |
| 31 | 5 |

FIG. 5

INCREMENTAL DATA VALIDATION

BACKGROUND

Technical Field

This application generally relates to data validation.

Description of Related Art

User data entry, such as using a keyboard or other input device, may be performed in connection with various tasks on a computer, phone, tablet or other suitable device. A user may enter data that is a long sequence of predetermined characters such as, for example, when entering a license code associated with installing software. There is a problem in that the user may make an error in connection with entering the correct characters of the sequence. Verification or validation of the user entered data may be performed after the user has completed entry of what he or she believes to be the entire correct character sequence. Errors detected in user entered data only after the entire character sequence is entered result in the user having to recheck the entire entered character sequence since any one or more of the characters entered may be incorrect.

SUMMARY OF THE INVENTION

In accordance with one aspect of the invention is a method of performing data validation. The method comprises: determining an expected sequence of characters including a plurality of groups, each of the plurality of groups including a first expected sequence of one or more characters representing encoded information and a second expected sequence of one or more data validation characters determined in accordance with a corresponding portion of the expected sequence, the portion including at least the first expected sequence of one or more characters of said each group; and performing data validation processing incrementally as data for each of the plurality of groups is received, wherein the data validation processing performed as data for said each group is received uses a received sequence of one or more data validation characters corresponding to the second expected sequence of one or more data validation characters of said each group. The method may include receiving an input string including a first portion corresponding to a first of the plurality of groups, the first portion including a first received data validation character sequence of one or more data validation characters corresponding to the second expected sequence of one or more data validation characters of the first group, the first portion including first data corresponding to the first expected sequence of one or more characters of the first group; and performing data validation for a second portion of the input string, the second portion including at least the first portion. The data validation processing performed for the second portion may include determining, in accordance with a data validation algorithm and one or more inputs to the data validation algorithm, a first calculated sequence of one or more data validation characters, the one or more inputs including the first data; and determining whether the first received data validation sequence of one or more data validation characters matches the first calculated sequence of one or more data validation characters. Performing data validation for the second portion of the input string may include responsive to determining that the first calculated sequence matches the first received data validation character sequence of one or more data validation characters, determining no data validation error for the second portion; and responsive to determining that the first calculated sequence does not match the first received data validation character sequence of one or more data validation characters, determining a data validation error for the second portion. The data validation algorithm may be a hash function that determines a first hash value for the second portion. The hash function may be cryptographic hash function. The first hash value may be used to determine the first calculated sequence, and the first calculated sequence may include a first character that is a character encoding a number of bits of the first hash value. The number of bits may denote a number of bits of information encoded by each character of the first expected sequence of one or more characters of the first group. Performing data validation for the second portion of the input string may include determining whether the first character matches a corresponding character of the first received data validation character sequence of one or more data validation characters. The second portion may include another portion of the input string. The another portion may correspond to other data received at a point in time prior to the first portion. The another portion may include one or more characters corresponding to at least one of the plurality of groups other than the first group. The at least one group ay occur in the expected sequence of characters prior to the first group. The one or more inputs to the data validation algorithm may further include at least one character of the another portion. The another portion may correspond to all non-space characters of the expected sequence of characters preceding the first group in the expected sequence of characters. The another portion may correspond to selected characters of one or more of the plurality of groups of the expected sequence of characters preceding the first group in the expected sequence of characters. The selected characters may exclude all data validation characters of the one or more of the plurality of groups preceding the first group in the expected sequence of characters. The method may include receiving a first input string including a first portion corresponding to a first of the plurality of groups, the first portion including a first received data sequence of one or more characters corresponding to the first expected sequence of one or more characters of the first group, the first portion including a first received data validation sequence of one or more data validation characters corresponding to the second expected sequence of one or more data validation characters of the first group; and performing data validation processing for the first input string after receiving the first portion. The data validation processing performed for the first input string may include determining, in accordance with a data validation algorithm and first one or more inputs to the data validation algorithm, a first calculated sequence of one or more data validation characters, the first one or more inputs including the first received data sequence; and determining whether the first received data validation sequence of one or more data validation characters matches the first calculated sequence of one or more data validation characters. The method may include receiving a second input string including the first portion corresponding to the first group and a second portion corresponding to a second of the plurality of groups different from the first group, said first group occurring in the expected sequence prior to the second group, the second portion including a second received data sequence of one or more characters corresponding to the first expected sequence of one or more characters of the second group, the second portion including a second received data validation sequence of one or more data validation characters corresponding to the second expected sequence of one or more data validation characters of the second group; and performing data validation processing for the second input string after receiving the second portion. The data validation processing for the second input string may include determining, in accordance with the data validation algorithm and second one or more inputs to the data validation algorithm, a second calculated sequence of one or more data validation characters, the second one or more inputs including the first received data sequence and the second received data sequence; and determining whether the second received data validation sequence of one or more data validation characters matches the second calculated sequence of one or more data validation characters. The expected sequence of characters may encode information that is any of a license code, a password, a digital signature, a cryptographic key, and a serial number, and wherein data corresponding to each of the plurality of groups that is received is entered by a user using an input device. A user interface may perform data validation processing that incrementally performs data validation processing after data is entered for each of the plurality of groups.

In accordance with another aspect of the invention is a computer readable medium comprising code stored thereon that, when executed, performs a method of data validation. The method comprises: performing data validation processing incrementally as data corresponding to each of a plurality of groups is received, wherein an expected sequence of characters includes the plurality of groups, each of the plurality of groups including a first expected sequence of one or more characters representing encoded information and a second expected sequence of one or more data validation characters determined in accordance with a corresponding portion of the expected sequence, the portion including at least the first expected sequence of one or more characters of said each group, wherein the data validation processing performed as data corresponding to said each group is received uses a received sequence of one or more data validation characters corresponding to the second expected sequence of one or more data validation characters of said each group. The method may include receiving a first input string including a first portion corresponding to a first of the plurality of groups, the first portion including a first received data sequence of one or more characters corresponding to the first expected sequence of one or more characters of the first group, the first portion including a first received data validation sequence of one or more data validation characters corresponding to the second expected sequence of one or more data validation characters of the first group; and performing data validation processing for the first input string after receiving the first portion. The data validation processing performed for the first input string may include determining, in accordance with a data validation algorithm, and first one or more inputs to the data validation algorithm, a first calculated sequence of one or more data validation characters, the first one or more inputs including the first received data sequence; and determining whether the first received data validation sequence of one or more data validation characters matches the first calculated sequence of one or more data validation characters. The method may include receiving a second input string including the first portion corresponding to the first group and a second portion corresponding to a second of the plurality of groups different from the first group, said first group occurring in the expected sequence prior to the second group, the second portion including a second received data sequence of one or more characters corresponding to the first expected sequence of one or more characters of the second group, the second portion including a second received data validation sequence of one or more data validation characters corresponding to the second expected sequence of one or more data validation characters of the second group; and performing data validation processing for the second input string after receiving the second portion. The data validation processing for the second input string may include determining, in accordance with the data validation algorithm and second one or more inputs to the data validation algorithm, a second calculated sequence of one or more data validation characters, the second one or more inputs including the first received data sequence and the second received data sequence; and determining whether the second received data validation sequence of one or more data validation characters matches the second calculated sequence of one or more data validation characters. The expected sequence of characters may encode information that is any of a license code, a password, a digital signature, a cryptographic key, and a serial number, and wherein data corresponding to each of the plurality of groups that is received is entered by a user using an input device.

In accordance with another aspect of the invention is a system comprising a processor; and a memory comprising code stored thereon that, when executed, performs a method of encoding information. The method comprises determining an expected sequence of characters including a plurality of groups, each of the plurality of groups including a first expected sequence of one or more characters representing encoded information and a second expected sequence of one or more data validation characters determined in accordance with a corresponding portion of the expected sequence, the portion including at least the first expected sequence of one or more characters of said each group. The first expected sequences of one or more characters for the plurality of groups representing encoded information of the expected sequence may form any of a license code, a password, a digital signature, a cryptographic key, and a serial number. The plurality of groups may include a first group and a second group occurring in the expected sequence after the first group. The method may further comprise determining the second expected sequence of one or more data validation characters for the first group using a data validation algorithm and first one or more inputs to the data validation algorithm, the first one or more inputs including first expected sequence of one or more characters for the first group; and determining the second expected sequence of one or more data validation characters for the second group using the data validation algorithm and second one or more inputs to the data validation algorithm, the second one or more inputs including the first expected sequence for the second group and including at least one character of the first expected sequence for the second group.

BRIEF DESCRIPTION OF THE DRAWINGS

Features and advantages of the present invention will become more apparent from the following detailed description of exemplary embodiments thereof taken in conjunction with the accompanying drawings in which:

FIGS. 4 and 5 are examples illustrating tables that may be used in embodiments in accordance with techniques herein.

DETAILED DESCRIPTION OF EMBODIMENT(S)

Figure 1:
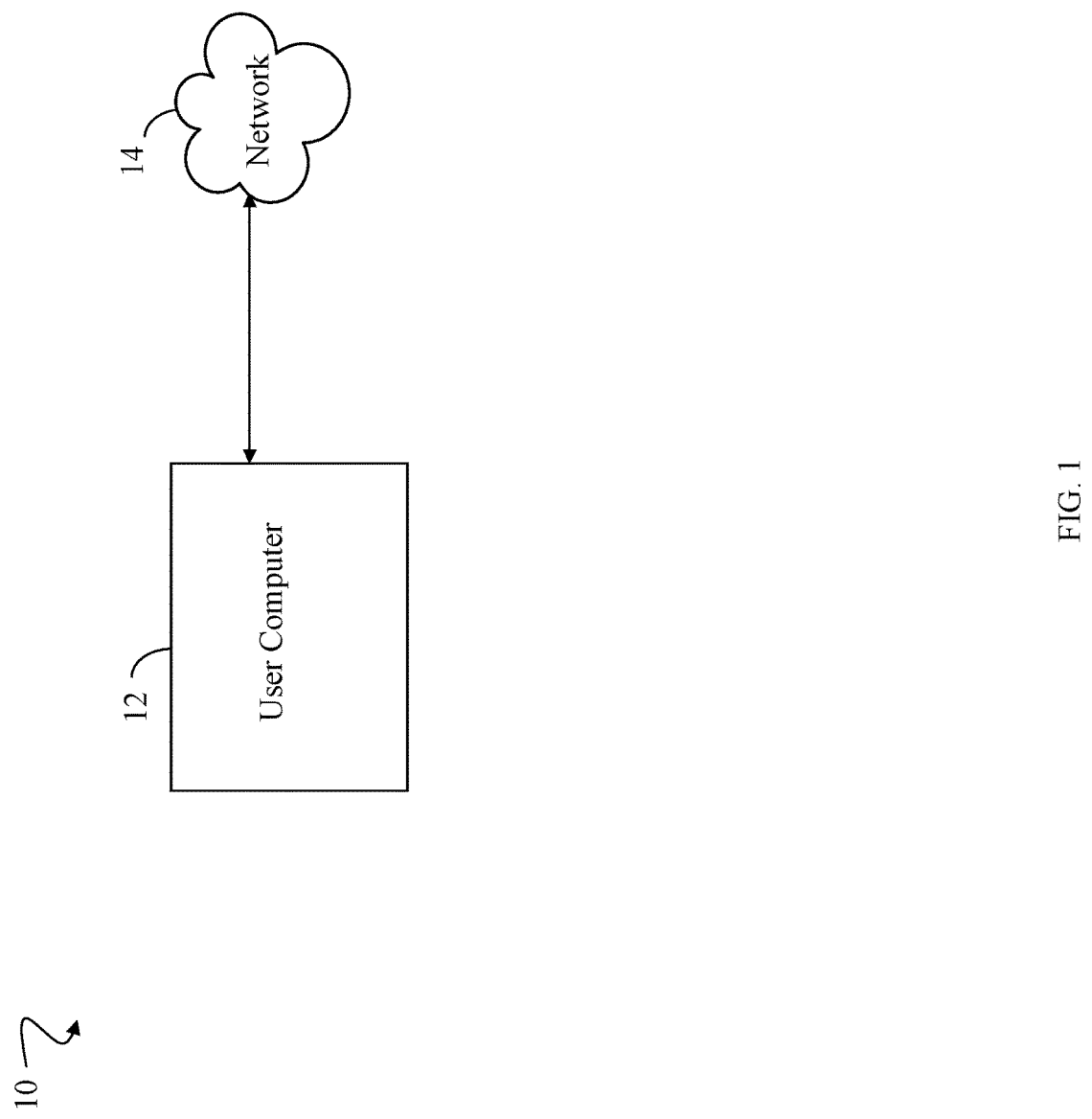
FIG. 1 is an example of an embodiment illustrating an environment that may be utilized in connection with the techniques described herein.

Referring now to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, phones, computer tablets, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1 is a user computer 12 and a network 14. The user computer 12 may include a standard, commercially-available computer or a special-purpose computer that may be used to execute one or more program modules. Described in more detail elsewhere herein are program modules that may be executed by the user computer 12 in connection with facilitating verification or validation of data, such data be entered by a user, which may then be validated using techniques described herein. The user computer 12 may operate in a networked environment and communicate with other computers not shown in FIG. 1. For example, the user computer 12 may communicate with one or more components utilizing a network connection, and/or other type of link known in the art including, but not limited to, the Internet, an intranet, or other wireless and/or hard-wired connection(s). The user computer 12 may also operate as a standalone system.

Figure 2:
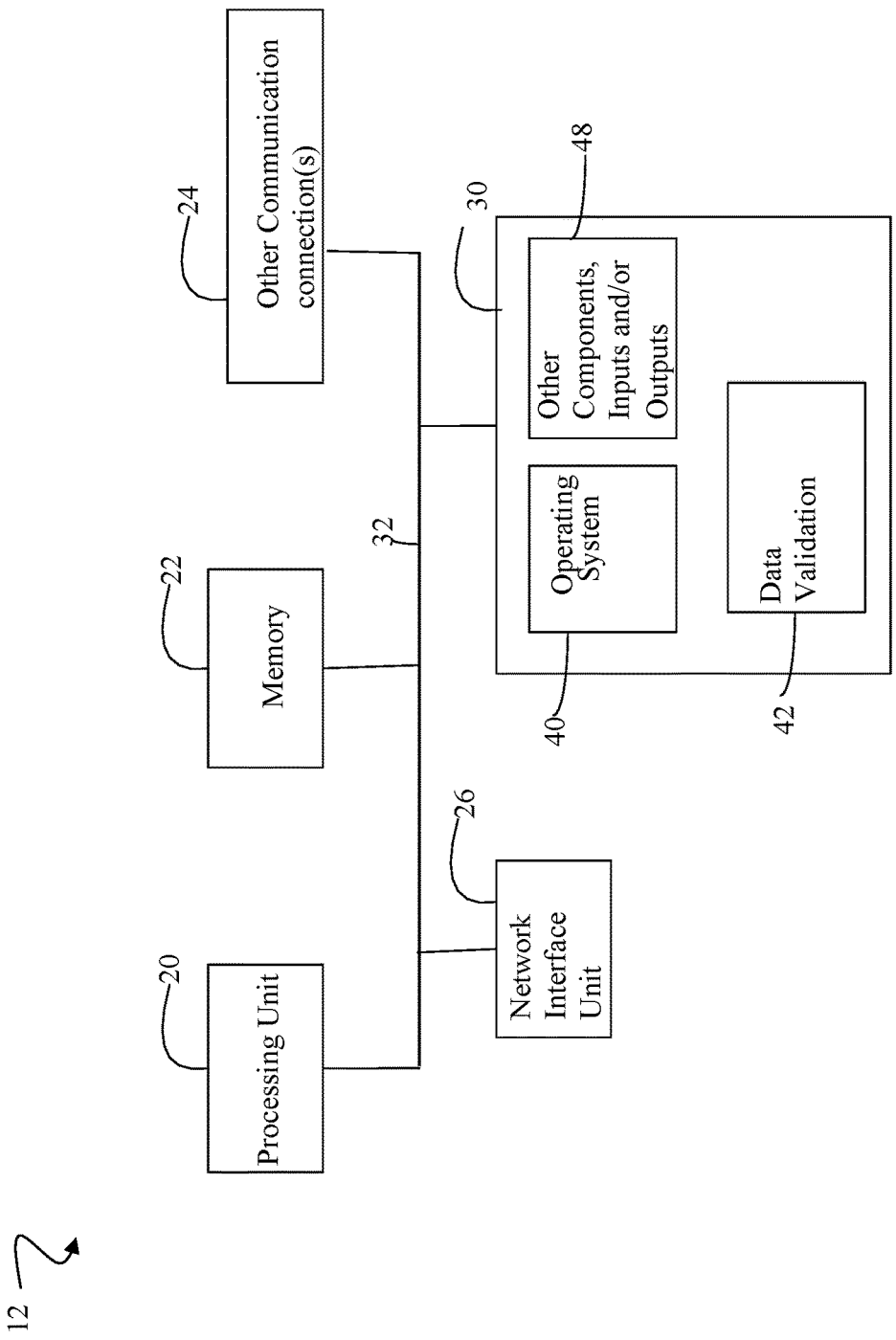
FIG. 2 is an example of components that may be included in an embodiment of a user computer for use in connection with performing the techniques described herein.

Referring now to FIG. 2, shown is an example of components that may be included in a user computer 12 as may be used in connection with performing the various embodiments of the techniques described herein. The user computer 12 may include one or more processing units 20, memory 22, a network interface unit 26, storage 30, one or more communication connections 24, and a system bus 32 used to facilitate communications between the components of the computer 12.

Depending on the configuration and type of user computer 12, memory 22 may be volatile (such as RAM), non-volatile (such as ROM, flash memory, etc.) or some combination of the two. Additionally, the user computer 12 may also have additional features/functionality. For example, the user computer 12 may also include additional storage (removable and/or non-removable) including, but not limited to, USB devices or other forms of solid state storage, magnetic or optical disks, or tape. Such additional storage is illustrated in FIG. 2 by storage 30. The storage 30 of FIG. 2 may include one or more removable and non-removable storage devices having associated computer-readable media that may be utilized by the user computer 12. It will be appreciated by those skilled in the art that the computer-readable media can be any available media that can be accessed by the user computer 12.

The user computer 12 may also contain communications connection(s) 24 that allow the user computer to communicate with other devices and components such as, by way of example, input devices and output devices. Input devices may include, for example, a keyboard, mouse, pen, voice input device, touch input device, etc. Output device(s) may include, for example, a display, speakers, printer, and the like. These and other devices are well known in the art and need not be discussed at length here. The one or more communications connection(s) 24 are an example of communication media.

In one embodiment, the user computer 12 may operate in a networked environment as illustrated in FIG. 1 using logical connections to remote computers through a network. The user computer 12 may connect to the network 14 of FIG. 1 through a network interface unit 26 connected to bus 32. The network interface unit 26 may also be utilized in connection with other types of networks and/or remote systems and components.

One or more program modules and/or data files may be included in storage 30. During operation of the user computer 12, one or more of these elements included in the storage 30 may also reside in a portion of memory 22, such as, for example, RAM for controlling the operation of the user computer 12. The example of FIG. 2 illustrates various components including an operating system 40, data validation module 42, and other components, inputs, and/or outputs 48. The operating system 40 may be any one of a variety of commercially available or proprietary operating systems. The operating system 40, for example, may be loaded into memory in connection with controlling operation of the user computer. Data validation module 42 may generally represent code which performs data validation techniques as described elsewhere herein. Generally, element 42 may represent one or more modules, processes, threads, or other suitable code entities which perform processing as described herein in a particular embodiment in accordance with techniques herein. The other components, inputs and/or outputs 48 generally represent other elements that may be used in connection with performing the techniques described herein. The components illustrated in FIG. 2 are described in more detail in following paragraphs.

When a user is asked to type a long, predetermined sequence of characters that encodes some information in what appears to the user to be random strings, there is a problem in that the user is likely to make errors in typing some of those characters. Common examples of when a user may enter such a predetermined sequence of characters may include entering a license code associated with installing software, entering printed codes associated with raffles where such printed code may be printed on receipts or product packaging, a long password of randomly selected characters, and the like. It may be desirable to detect any user data entry errors as soon as possible after entered by the user so that the user can recheck the input and make any needed corrections to the data entered. If errors are detected only after the user completes entry of the entire string of data, the user will have to recheck the entire string to determine what one or more characters have been incorrectly entered.

Accordingly, techniques are described herein which provide for incremental validation of data, such as a user input string. Such techniques provide more localized feedback to the user as the user enters portions of an expected input string rather than simply perform a single check of the entire entered input string. In accordance with techniques herein, validation values or characters may be embedded within the sequence of expected characters whereby a correctly entered user input string will include the embedded validation values or characters interspersed among the expected characters of the sequence. The validation values or characters may be embedded at various positions within the sequence of expected characters allowing for validation of portions of the input data entered up to a particular validation value or character. An example of a validation value or character that may be used with techniques herein is a checksum character that may be determined with any suitable algorithm. For example, a checksum may be determined, for example, as a sum of the bytes of an original data item, such as a license key or code. A first operation may be performed to generate the license key or code which is a predetermined character sequence to be given to a user. The predetermined character sequence may include characters of encoded license information and checksum characters. The checksum characters of the predetermined character sequence are computed for portions of the encoded license information using a first checksum algorithm and inserted at various points into the predetermined character sequence. In a second operation, processing may be performed where the user may be given the predetermined character sequence, such as in a printed form for the license key or code, and the user types in an input string intended to match the predetermined character sequence. In connection with application to the user entered input string, a checksum may be computed for a portion of the user entered input string intended to correspond to a portion of the encoded license information. The checksum is computed using the same first checksum algorithm as the original data. The computed checksum may be compared to a user entered checksum included in the user entered input string. If the computed checksum and the user entered checksum do not match, then one or more characters of the portion of the user entered input string do not match the portion of the encoded license information of original data item. Thus, the checksums may be used to check the validity of the user entered input string as compared to the original data.

A checksum can be computed in many different ways, using different algorithms. An embodiment in accordance with techniques herein may use one of the above-mentioned algorithms, such as determining a checksum as the sum of bytes in the original data item, which may be characterized in one aspect as rather simplistic. However, such a checksum determined as a sum of bytes may not be sufficiently reliable depending on a desired level or probability of detecting an error in the user entered input as compared to the original data item. For example, the same checksum value may be determined for two different user entered inputs where the algorithm used calculates a checksum as a sum of bytes in a data item. A first user input may have the same checksum as another second user input that is different than the first user input where the second user input includes the same bytes as the first user input but with two or more bytes appearing in a different order. Thus, two checksums may be the same for two different input strings. A non-match between two checksums computed for two data items indicates an error or difference between the two data items. However, a match between such two checksums does not necessarily mean the absence of errors or differences between the two data items, but only that the particular checksum algorithm used to calculate the two checksums was not able to detect any difference between the two data items.

Thus, an embodiment in accordance with techniques herein may generally select any suitable data validation algorithm for determining a checksum which has a desired or acceptable probability of detecting an error in the user input as compared to the original data item. An embodiment in accordance with techniques herein may use rather simple algorithms to calculate checksums, such as a sum of bytes in a data item, or may alternatively use more advanced or complex checksum algorithms to perform data validation between an original data item and a user entered input string. Different data validation algorithms have different probabilities of detecting user input errors and a particular algorithm may be selected which provides a desired or acceptable probability of detecting an error in the user input. In other words, different data validation algorithms may be used with techniques herein where such algorithms may have different probabilistic rates of incorrectly determining that such two data items match when in fact the differ by one or more characters. For example, rather than calculate a checksum as a sum of bytes in a data item, an embodiment in accordance with techniques herein may use a cyclic redundancy check (CRC) algorithm or cryptographic hash function in connection with determining a checksum for a data item. Examples of an algorithm such as a cryptographic hash function used in connection with calculating a checksum with techniques herein are described in more detail in following paragraphs and figures. Thus, described in following paragraphs are techniques that may be used in connection with encoding information in a sequence of characters where the sequence includes characters of an encoded data item or other content and encoded checksum characters embedded in the sequence among characters of the encoded data item. Such techniques may be used, for example, to check the validity of characters in a user entered input up to each particular checksum character to be checked incrementally. For example, upon the occurrence of a first checksum character in a user entered input at a first point in time, validation processing may be performed with respect to characters entered prior to the first checksum character. A user may then enter additional characters including a second checksum character at a second point in time where further validation processing may be performed with respect to characters entered prior to the second checksum character. In this manner, user entered input may be incrementally validated using checksum characters embedded in the input. As described herein, it is the nature of checksums to not always detect errors or differences between an original data item and a second data item, such as a user entered input string. However, a checksum algorithm used to determine checksums in a particular embodiment in accordance with techniques herein has a sufficiently high probability that an incorrectly entered user input string will be identified as incorrect to aid the user in finding any errors in his/her entered user input string.

It should be noted that as used herein, a checksum and an algorithm used to determine the checksum may more generally denote, respectively, a data validation or verification algorithm used to determine a data validation character or value.

Figure 3:
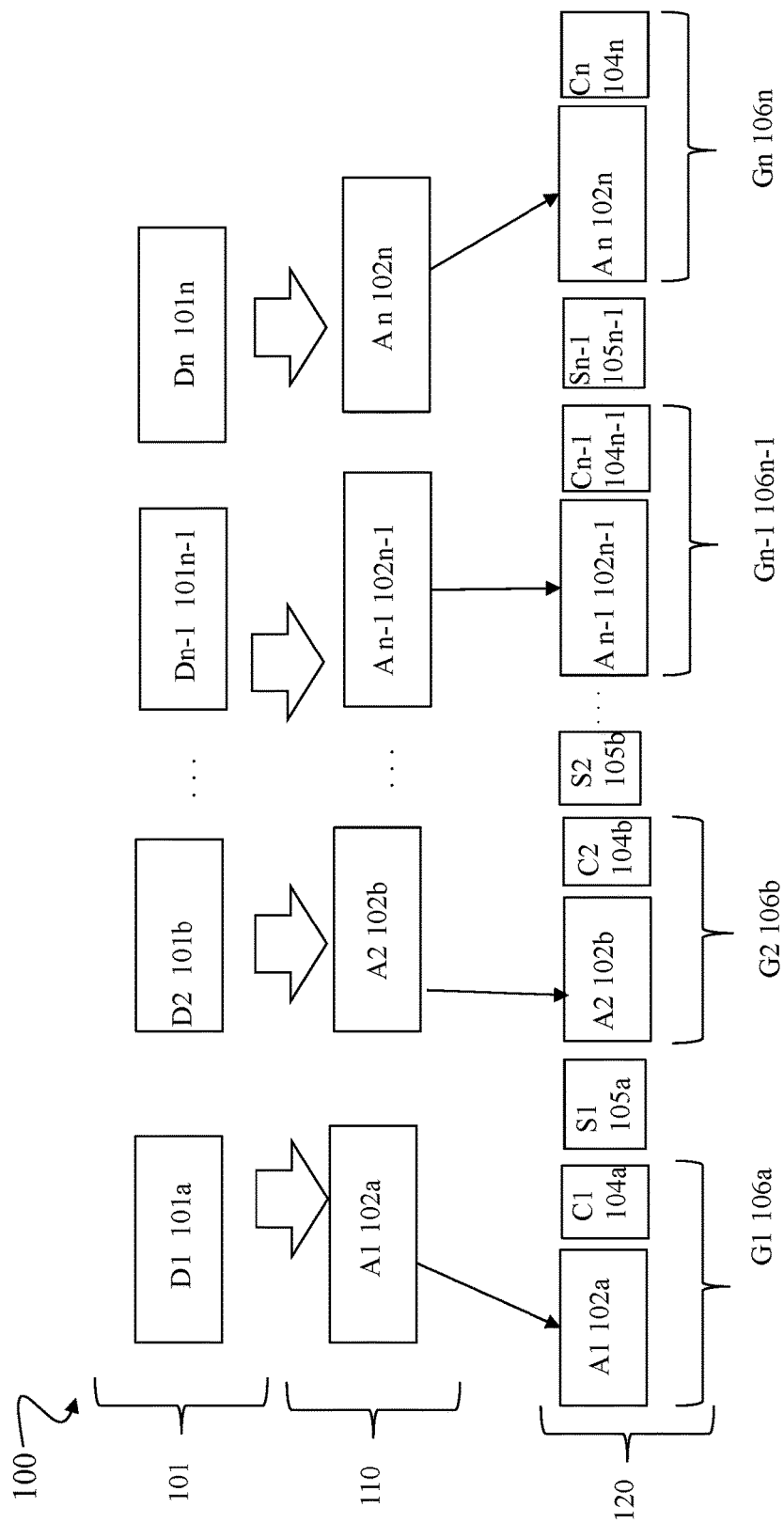
FIG. 3 is an example illustrating a sequence of characters including groups of characters that may be used in an embodiment in accordance with techniques herein.

Referring to FIG. 3, shown is an example of a predetermined sequence of characters as may be used in an embodiment in accordance with techniques herein for data validation. The example 100 includes original information or content 101 that may be encoded as a string of characters 110. The original information or content denoted by 101 may represent, for example, a bit pattern forming a license code or other information. The bit pattern of the original information or content 101 may be divided into multiple partitions denoted as D1 101a-Dn 101n, where "n" is an integer denoting the number of partitions. Generally, "n" may be 2 or more in an embodiment in accordance with techniques herein. Each of the partitions D1 101a-Dn 101n of original information or content may be encoded as a corresponding sequence of characters, respectively, A1 102a-An 102n. Each of the n character sequences A1 102a-An 102n may include 2 or more characters where each such character represents a character encoding of a number of bits of the corresponding partition D1 101a-Dn 101n of the original information or content 101. More generally, each of the n character sequences A1 102a-An 102n may include 1 or more characters where each such character represents a character encoding of a number of bits of the corresponding partition D1 101a-Dn 101n of the original information or content 101. For example, in at least one embodiment in accordance with techniques herein, each of the n sequences A1 102a-An 102n may include 4 characters of encoded information where each of the 4 characters may encode 6 bits of original content or information from 101. For example, element A1 102a may denote 4 characters encoding D1 101a containing the first 24 bits of original information or content 101, element A2 102b may denote another sequence of 4 characters encoding D2 101b, the next 24 bits of original information or content 101, and so on, for each of the n partitions 101a-101n of the original information or content 101. In at least embodiment in accordance with techniques herein, each character in 110 may be a base-64 character encoding of 6 bits of the original content from 101. Generally, base-64 encoding uses an alphabet of 64 characters providing a binary to character encoding scheme whereby binary data may be represented in a string format by translation of each grouping of 6 bits into a character of the specified base-64 alphabet.

Element 120 denotes the predetermined or expected character sequence that may be used in connection with techniques herein which includes the character encoding 110 of the original content 101 (e.g., such as a license code, password and the like), along with embedded data validation characters C1 104a-Cn104n. In the example of 120, spaces S1 105a-Sn-1 105n-1 may be added, respectively, after each of the data validation characters C1 through Cn-1. Each of G1 106a-Gn 106n may denote a different grouping including one of the sequences of characters A1 102a-An 102n followed by a corresponding one of the expected data validation characters C1 104a-Cn 104n. Generally, as described in more detail below, each of the data validation characters C1 104a-Cn 104n may be used in connection with validating a portion of the entire sequence of characters from 120 which have been occur prior to that particular one of the data validation characters. The particular characters of 120 used to determine each of the data validation character C1 104a-Cn 104n may vary with embodiment.

In an embodiment in accordance with techniques herein, a data validation character included in a particular one of the groups G1 106a-Gn 106n may be determined using at least the particular one sequence of the characters 102a-102n in the same group. For example, G1 106a denotes the group of characters A1 102a followed by C1 104a. The data validation character C1 104a may be a character encoding a data validation value determined using the characters A1 102a. Consider further G2 106b that denotes the group of characters A2 102b followed by C2 104b. The data validation character C2 104b may be a character encoding a data validation value determined using at least the characters A2 102b and may optionally use one or more other characters occurring in 120 prior to A2 102b. For example, in at least one embodiment, each of the data validation characters C1 104a-Cn 104n may be determined using the entire string of characters of 120, except for spaces, prior to the particular data validation character. For example, the data validation character C2 104b may be a character encoding a data validation value determined using all non-space characters occurring in 120 prior to C2 104b (e.g., C2 104b may be determined using A1 102a, C1 104a and A2 102b). In a similar manner, the data validation character Cn 104n may be a character encoding a data validation value determined using all non-space characters occurring in 120 prior to Cn 104n (e.g., Cn 104n may be determined using A1 102a through An-1 102n-1, and also C1 104a through Cn-1 104n-1). As yet another variation, in at least one embodiment, each of the data validation characters C1 104a-Cn 104n may be determined using all characters of 120, except for spaces and other data validation characters, prior to the particular data validation character. For example, the data validation character C2 104b may be a character encoding a data validation value determined using all characters occurring in 120 prior to C2 104b except for spaces and data validation character C1 104a (e.g., C2 104b may be determined using A1 102a and A2 102b but not using C1 104a). In a similar manner, the data validation character Cn 104n may be a character encoding a data validation value determined using all characters occurring in 120 prior to Cn 104n except for spaces and also without using data validation characters C1 104a-Cn-1 104n-1 (e.g., Cn 104n may be determined using A1 102a through An-1 102n-1, but without using C1 104a through Cn-1 104n-1).

It should be noted that the particular number of characters used in determining each of the data validation characters C1 104a through Cn 104n may vary with a desired or acceptable probability of false negatives occurring where a correct data validation is determined even though a user entered an incorrect character. Thus, as more characters entered prior to a data validation character are used in determining the data validation character, the probability of a false negative occurrence (e.g., failing to detect an incorrectly entered character) further decreases. In such a case, an embodiment determining each data validation character using all non-space characters occurring prior to such data validation character may have the lowest possible probability of a false negative occurrence.

It should also be noted that element 120 of FIG. 3 illustrates an embodiment with a single data validation character (e.g., one of C1 104a-Cn 104n) included in each of the groups G1 106a-Gn 106n. More generally, techniques herein are not so limited to a single data validation character per group G1 1-6a-Gn 106n. More generally, techniques herein may be used in connection with each of groups G1 106a-Gn 106n including a sequence of one or more data validation characters. For example, as a variation, each of the groups G1 106a-Gn 106n may include two data validation characters. As further variations to the particular embodiment of FIG. 3, spaces are illustrated as delimiting characters which are described as not being included in the input string to the cryptographic hash function. However, an embodiment in accordance with techniques herein may use any suitable delimiter and/or may also include such delimiters in the input to the cryptographic hash function. Generally, the cryptographic hash function such as a SHA-2 cryptographic hash function described herein, may take as an input a string of any arbitrary and suitable length.

As discussed elsewhere herein, each of the data validation characters C1 104a-Cn 104n may be determined using any suitable algorithm. For example, in at least one embodiment in accordance with techniques herein, the data validation characters 104a-104n may be determined using a hashing function, such as a cryptographic hashing function. For example, G1 106a denotes the group of characters A1 102a followed by C1 104a. The data validation character C1 104a may be a character encoding a data validation value determined for the characters A1 102a. Consider further the embodiment as noted above where each sequence of characters 102a-102n includes 4 base-64 characters encoding 24 bits of original content 101. In such an embodiment, data validation character C1 may be calculated using a cryptographic hashing algorithm, such as a SHA-2 (Secure Hash Algorithm 2) cryptographic hash function, which generates a hash value (HV). Generally, a cryptographic hash function is a hash function which is considered practically impossible to invert, that is, to recreate the input data from its hash value alone. Thus, a cryptographic hash function may be characterized as a one-way hash function in which input data may be used to determine a hash value but, given the hash value, its corresponding input data may not be capable of being determined, or may otherwise not practically be determined. In particular, an embodiment in accordance with techniques herein may use a SHA-2 cryptographic hash function that generates a 256 bit HV from which 6 bits may be selected for encoding as a data validation value. For example, the 6 bits selected may be the 6 least significant bits (LSBs), the 6 most significant bits (MSBs), or any other particular 6 bits from the generated 256 bit HV. The 6 bits may then be encoded as a base-64 character. In connection with determining a 256 bit HV using a SHA-2 cryptographic hash function for A1 102a, the hash key input to the hashing function may be a concatenated string of characters, such as a concatenated string of the 4 base-64 characters of A1 102a. The concatenated character string of the characters of A1 102a may be input to the hashing function which is then used to determine the 256 bit HV for A1 102a. Subsequently, 6 bits may be selected from the 256 bit HV where the selected 6 bits (e.g., such as the 6 MSBs or LSBs) may be encoded as a base-64 character used as C1 104a.

As described above, subsequent data validation characters, such as any of C2 104b through Cn 104n, may be similarly determined using a portion of the sequence of characters 120 occurring prior to that particular validation character. Further the portion of 120 used to determine one of the validation characters included in a particular one of the groups G2 106b through Gn 106n may include at least the particular portion of 4 base-64 characters (e.g., at least the particular one of 102a-102n) in the same one of the groups G2 106b through Gn 106n as the data validation character being determined. For example, in an embodiment using the SHA-2 cryptographic hash function, the data validation character C2 104b may be determined by concatenating the foregoing portion of characters where the portion of characters includes at least the 4 base-64 characters of A2 102b. Consistent with discussion above, the portion of characters of 120 concatenated and used as the input to the hash function may optionally also include any one or more characters prior to A2 102b (e.g., whereby the concatenated string input to the hash function is determined by concatenating the optional one or more characters followed by the 4 characters from A2 102b. The hash function may be used to generate a 256 bit HV which may then be further processed as described above in connection with determining C1 104a whereby a 6 bit value may be determined and then encoded as a base-64 character used as C2 104b.

Thus, an embodiment in accordance with techniques herein may first generate a predetermined sequence of expected characters such as 120 of FIG. 3 where the predetermined sequence of expected characters may be provided to the user in some form, such as a printed form. A user may then enter an input string which is intended to match the predetermined sequence 120 and processing may be performed using techniques herein to validate the user input string incrementally as entered by the user. For example, with reference to the particular example of FIG. 3, techniques herein provide for validating portions of the user entered input string as the user enters characters which are intended to correspond to each of the groupings G1 106a through Gn 106n. After each space is entered denoting a delimiter between groupings, processing may be performed using techniques herein for data validation of user input intended to match the last entered one of the groups G1 106a-Gn 106n and optionally one or more other characters of the user input string occurring prior to the last entered one of the groupings G1 106a-Gn 106n. Thus, techniques herein may be characterized as providing incremental data validation in one aspect as validating the user entered input string in multiple portions. Additionally, techniques herein may be characterized as providing incremental data validation in another aspect as validating user entered input intended to be the last entered one of the groups G1 106a-Gn 106n and also may include one or more characters of user entered input intended to correspond to one or more other ones of groups G1 106a-Gn 106n occurring in the predetermined sequence prior to the last entered one of the groups. For example, as also described elsewhere herein, each data validation character may be determined using a cryptographic hash function taking as an input all characters occurring prior to the data validation character. In such an embodiment, consider the case where the user enters an incorrect character of A1 102a and performing first data validation for G1 106a does not detect the error (e.g., a false negative occurs). The first data validation performed in the particular example in accordance with techniques herein may determine a first calculated data validation character in accordance with user entered input corresponding to A1. The first calculated data validation character may be compared to a first user entered character corresponding to C1 104a. If the first calculated data validation character does not match the first user entered character corresponding to C1 104a, a data validation error may be detected. In the case of a false negative as in this example, the foregoing two characters match even though a user incorrectly entered a character of A1.

Continuing with the example, second data validation processing may be performed after the user enters additional input intended to correspond to G2 106b of the predetermined sequence where such second data validation uses as an input to the hash function all characters of the user input string occurring prior to the last entered input character intended to correspond to C2 104*b* (e.g., input to the hash function in the second data validation processing is a concatenation of A1, C1, A2).

The second data validation performed in the particular embodiment in accordance with techniques herein may determine a second calculated data validation character in accordance with user entered input corresponding to the concatenated string of A1, C1, A2. The second calculated data validation character may be compared to a second user entered character corresponding to C2 104*b*. If the second calculated data validation character does not match the second user entered character corresponding to C2 104*b*, a data validation error may be detected. In this example, it is determined that the second calculated data validation character does not match the second user entered character corresponding to C2 104*b* and a data validation error is detected in connection with the performing the second data validation processing after the user enters data corresponding to G2 106*b*. In this case, the second data validation processing may detect an input error occurring in any one or more of A1, C1, A2 and C2. Thus, an error detected in performing data validation using a data validation character of a particular one of the groups G1 106*a*-Gn 106*n* does not necessarily mean the error occurred in that particular group. Rather, the error may have occurred in other user input corresponding to another one of the groups G1 106*a*-Gn 106*n* occurring in the predetermined sequence prior to the particular group. Put another way, the same portion of user entered data (e.g., A1 102*a*) may be used in determining multiple data validation characters of multiple groups (e.g., C1 104*a* through Cn 104*n*). In this manner, an error occurring in the same portion of user entered data may be validated multiple times using the multiple data validation characters of multiple groups.

Figure 4:
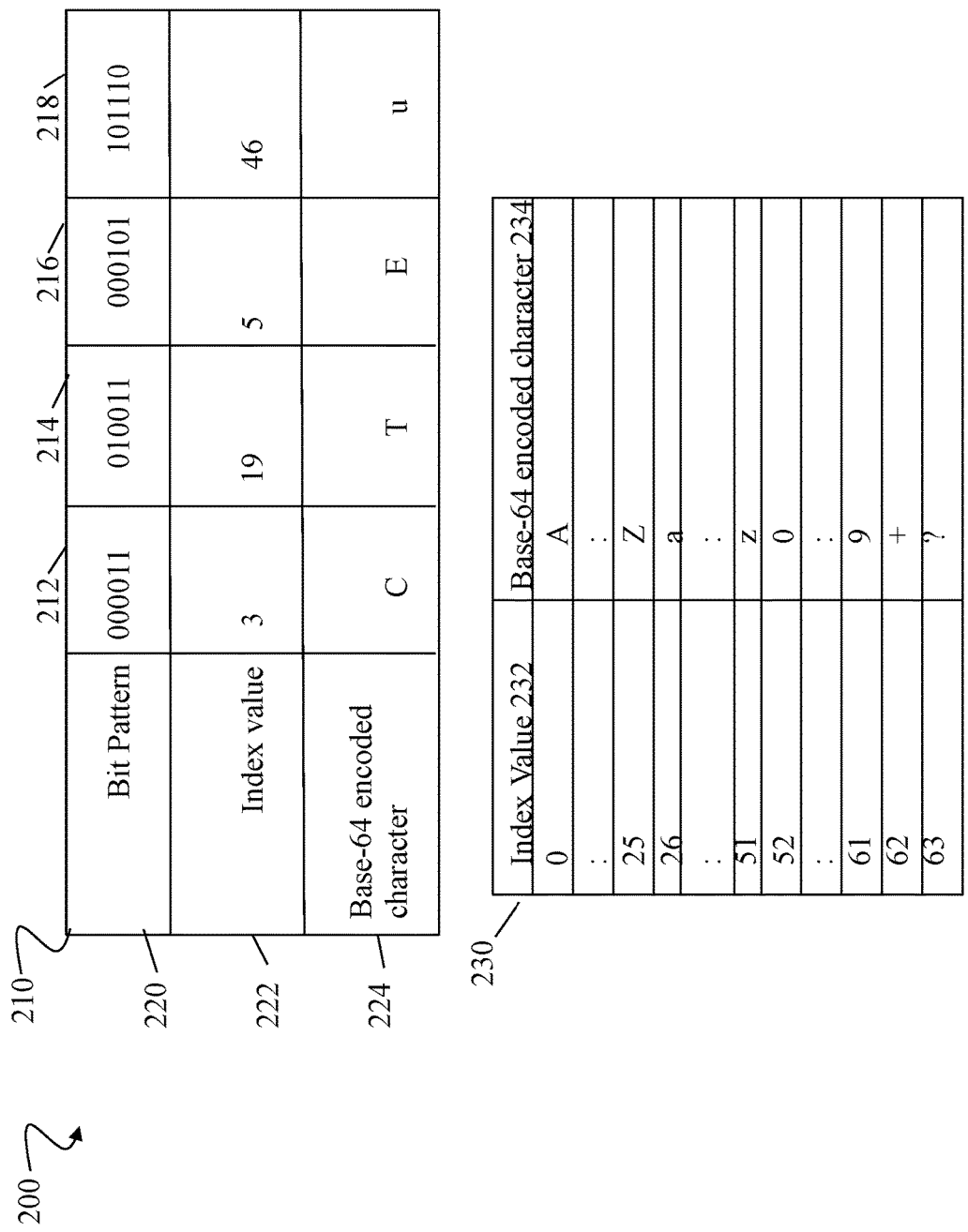

Referring to FIG. 4, shown is an example illustrating in more detail base-64 encoded characters that may be used in an embodiment in accordance with techniques herein. In the example 200, a table 210 includes row 220 of bit pattern, row 222 of index values, and row 224 of base-64 encoded characters. Table 210 also includes columns 212, 214, 216 and 218 denoting examples of particular bit patterns and corresponding index values and base-64 encoded characters.

Table 230 is a table denoting a mapping of various index values in column 232 to corresponding base-64 encoded characters 234. Generally, column 232 includes index values 0 through 63, where each such index value in column 232 may be mapped to a different base-64 character included in column 234. In this example, the base-64 character set or alphabet used to represent the encoding of the original content or information 101 may include lower case letters "a" through "z", upper case letter "A" through "Z", digits "0" through "9", and characters "+" and "?". It should be noted that, more generally, the characters comprising the base-64 character set or alphabet of column 234 may vary with embodiment and may include any suitable set of 64 unique characters. For example, in one application where a user may be entering characters via the keyboard, the characters of 234 should include those appearing on most keyboards. An embodiment may further customize the alphabet of base-64 characters used. For example, one embodiment may use the characters as illustrated in 234 with the difference that characters "O", "I" and "L" may be excluded since these may be confused with, and look similar to, zero "0" and "I". Such an embodiment may therefore use three other characters to replace the foregoing excluded characters "O", "I", and "L".

For purposes of illustration, assume row 220 includes the bit pattern denoting the original content or information of partition D1 101*a*. Consistent with discussion above, 101*a* includes 24 bits of information encoded as 4 base-64 characters of row 224. Thus, row 224 denotes the 4 characters "CTEu" of A1 102*a* encoding the information of row 220. To determine each of the 4 characters of row 224, 6 different bits from 220 may be used. For example, to determine the first base-64 character C (located in the entry of row 224, column 212), a decimal index value of 3 (located in row 222, column 212) is determined for the first 6 bits "000011" of row 220. The index value of 3 may then be mapped using table 230 to a corresponding base-64 character "C". In a similar manner, base-64 characters of table 234 may be determined for each of the remaining sets of 6 bits included in row 220. For column 214, an index value of 19 may be determined for the 6 bits "010011" where the index value of 19 may be mapped using table 230 to a base-64 character T (e.g., T is a character included in 110 encoding the 6 bits "010011"). For column 216, an index value of 5 may be determined for the 6 bits "000101" where the index value of 5 may be mapped using table 230 to a base-64 character E (e.g., E is a character included in 110 encoding the 6 bits "000101"). For column 218, an index value of 46 may be determined for the 6 bits "101110" where the index value of 46 may be mapped using table 230 to a base-64 character u (e.g., u is a character included in 110 encoding the 6 bits "000101").

Thus, the above discussion with reference to FIG. 4 describes in more detail an example of how one sequence of characters 102*a* (e.g., 4 characters of row 224) may be determined which encode original information or content from partition D1 101*a* (e.g., represented as a bit pattern as in row 220). In a similar manner, processing may be performed to determine remaining base-64 character sequences A2 102*b* through An 102*n* encoding, respectively, remaining partitions D2 101*b* through Dn 101*n*, where information of each of the foregoing partitions 101*b*-101*n* may be similarly represented using a 24 bit pattern.

Once the complete base-64 character encoding 110 of the original content or information 101 has been determined, processing may then be performed to determine each of the data validation characters C1 104*a*-Cn 104*n*. As described above, each of the data validation characters C1 104*a* through Cn 104*n* may be determined using at least the particular sequence of 4 base-64 characters (e.g., particular one of 102*a*-102*n*) immediately prior to each such data validation character and may use, for example, up to all non-space characters occurring prior to the particular data validation character being determined. In connection with determining a data validation character such as C1 104*a* in an embodiment using SHA-2 cryptographic hash function as described above, a 6 bit value may be determined which may then be mapped using table 230 to its corresponding base-64 character. For example, assume the 6 bit value (e.g., denoting the MSBs of the 256 bit HV output by SHA-2) has a decimal value of 61. In this case, 61 is used as the index value into table 230 which maps to a corresponding base-64 character of "9" used as C1 104*a*. In a similar manner, table 230 may be used to determine each of the remaining data validation characters C2 104*b* through Cn 104*n* using a portion of 120. For example, in at least one embodiment as described herein, all non-space characters occurring in 120 prior to each of the data validation characters 104*b*-104*n* may be used in determining that particular data validation character. To further illustrate in this particular embodiment, C2 104*b* may be determined by performing a first step of concatenating characters of 102*a*, 104*a*, and 102*b* into a string, performing a second step of where the concatenated string of characters (from the first step) is used as an input into the SHA-2 cryptographic hash function to generate a 256 bit HV. In a third step, 6 bits of the 256 bit HV are selected to form a 6 bit value used an index value 232 mapped using table 230 to one of the base-64 characters 234 denoting the data validation character C2 104*b*.

It should be noted that base-64 characters used to encode 6 bits of information are only one example of a particular encoding alphabet that may be used in an embodiment in accordance with techniques herein. For example, as an alternative, an embodiment in accordance with techniques herein may use base-32 characters to encode 5 bits of information. In such an embodiment with reference back to FIG. 3, each base-32 character in 110 may encode 5 bits of original content or information from 101 and each of the data validation characters C1 104*a* through Cn 104*n* may encode a 5 bit data validation value determined in a manner similar to the 6 bit validation values as described herein. For example, data validation character C1 104*a* may be determined as described above in connection with determining a 6 bit validation value where the 6 bits may be the 6 least or most significant bits of the 256 bit HV generated using the SHA-2 cryptographic hash function. In connection with the base-32 character encoding, a 5 bit validation value may be determined rather than the 6 bit validation value where the 5 bits may be selected from the 256 bit HV generated using the SHA-2 cryptographic hash function (e.g., may be the 5 least or most significant bits of the 256 bit HV generated using the SHA-2 cryptographic hash function). Subsequently, the 5-bit value may be encoded as a base-32 character using a mapping table similar to 230 of FIG. 4. For example, with reference to FIG. 5, shown is an example 330 of a base-32 mapping table that may be used to encode 5 bits of information in an embodiment in accordance with techniques herein. The table 330 includes a first column of index values 332 and a second column 334 of base-32 encoded characters comprising the base-32 encoding alphabet. The table 330 may be used in a manner as described herein in connection with table 230 of FIG. 4 with the difference that each index value in 332 denotes a decimal index value for 5 bits of information to be encoded rather than 6 bits as described in connection with table 230 of FIG. 4. The table 330 includes index value 0 through 31 in column 332 each of which is mapped to a corresponding different base-32 character in column 334. In this example 330, the base-32 characters of 334 include upper case alphabetic characters "A" through "Z", and digits "0" through "5". More generally, any suitable set of characters each encoding any suitable number of bits may be used in an embodiment in accordance with techniques herein.

Techniques as described herein may generally be used in connection with a variety of applications such as, for example, validating user entered input that may be any of, for example, a license code or string, a password, a digital signature, a serial number, a cryptographic key, and the like. In an embodiment in accordance with techniques herein, the input, such as the license code or string, password, digital signature, serial number, cryptographic key, and the like, may be the original content or information 101 of FIG. 3. In at least one embodiment in accordance with techniques herein, a user may be entering information as read from a printed paper or certificate and techniques described herein may be used in connection with performing data validation of the user entered information. As another use, the user may be entering information as heard by the user, such as over the phone or communicated verbally in some other manner to the user. In such a case, the particular characters selected for the encoding alphabet may be customized for ease of use with such verbal communication. For example, in such an application, the encoding alphabet may include either lower case letters of the English alphabet or upper case letters of the English alphabet but not both to avoid having to verbally distinguish upper case "A" from lower case "a". For example in this latter example, an embodiment may choose to use base-32 encoding as illustrated in FIG. 5 where each of the characters in 120 would rather encode 5 bits of information.

Described herein are techniques for encoding data validation characters embedded within a string also including other characters encoding content or data. The data validation characters may be interspersed in the string among the other characters encoding content or data. In one embodiment such as illustrated in FIG. 3, the string may be characterized as a predetermined or an expected sequence of groups of characters, where each group may include a predetermined data validation character and a predetermined sequence of one or more characters encoding content or data. In one application, validation of user entered data may be performed incrementally as various portions of user data corresponding to portion of the predetermined sequence are entered. For example, with reference to FIG. 3 and as described elsewhere herein, in at least one embodiment in accordance with techniques herein, each of the groups G1 106*a* through Gn 106*n* may include a sequence of one or more characters of encoded content (e.g., one of 102*a*-102*n*) and a data validation character (e.g., one of 104*a*-104*n*). Data validation may be performed after user entered input corresponding to each of the groups G1 106*a*-Gn 106*n* is entered using the particular data validation character of the newly entered group. In this manner, a user does not have to wait until data entry has been completed for all groups. Rather, data validation may be performed after entry of each group. In this manner, a user may be informed of any data validation error determined in a more timely manner rather than wait until data entry has been completed for all groups. For example, if the user is entering a license code, data validation may be performed on groups of the license code as entered by the user. Any data validation error found may be provided with the user in a timely manner and the used is provided with greater specificity regarding where the data validation error occurred. In particular, the data validation error is known to have occurred in one or more characters prior to the data validation code used. Thus techniques as described herein provide an advantage in that errors in data entry are detected more quickly and more localized.

As will be appreciated by those skilled in the art, techniques herein may be used in connection with data validation of user entered data, and more generally, with any suitable application. For example, techniques herein may more generally be used in connection with data validation of a string or data item received in incremental portions such as at different points in time. For example, with reference back to FIG. 3, element 120 may denote a predetermined sequence of an entire data item for which a user entered string may be transmitted and received in portions in a manner similar to a user incrementally entering data that is validated as each group of data is entered by the user. An embodiment in accordance with techniques herein may perform validation processing incrementally on each group of received user input data using the data validation character of each such group in a manner as described herein for user entered data. Thus, the techniques herein may be generally used in connection with incrementally performing data validation on portions or groups of a data item as received. As described herein, such data validation performed in connection with a last entered portion of user data corresponding to one of the groups of the predetermined sequence may perform data validation of the last entered portion of user data as well as other portions of previously entered user data of other groups. The data item may be any data entity suitable for processing using techniques herein.

As will be appreciated by those skilled in the art, techniques herein may be used in connection with performing data validation of input, such as user entered input with the intent to provide the user with an indication of any detected input errors without having to enter an input string corresponding to the entire predetermined or expected sequence of characters. In combination with techniques herein, an embodiment may also perform other processing after the entire user input string is entered which is supposed to match the predetermined or expected sequence of characters. Such other processing may determine whether there is an exact match between the entire entered user input string and the predetermined or expected sequence of characters.

Figure 6:
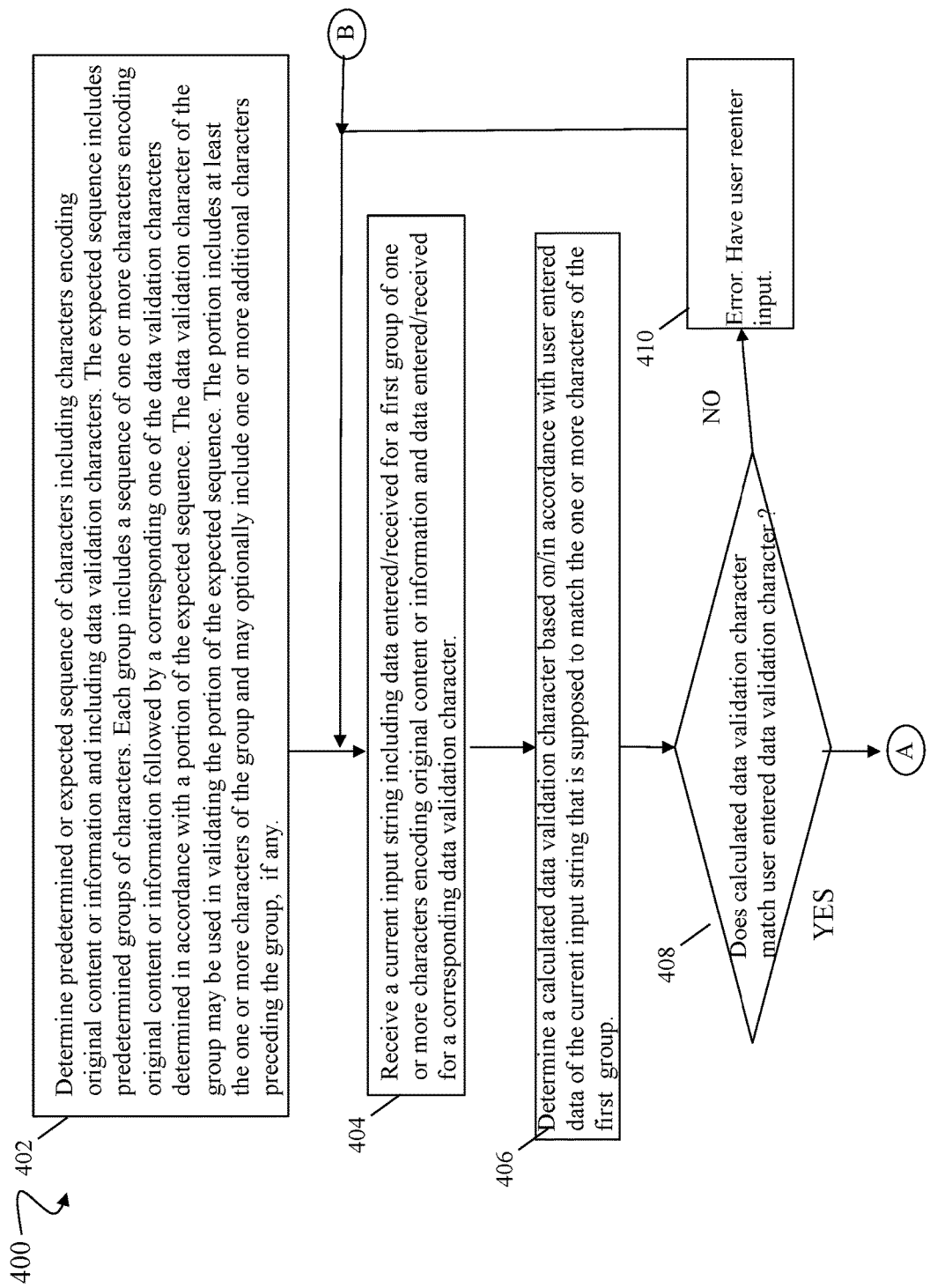
FIGS. 6 and 7 are examples of flowcharts of processing steps that may be performed in an embodiment in accordance with techniques herein.
Figure 7:
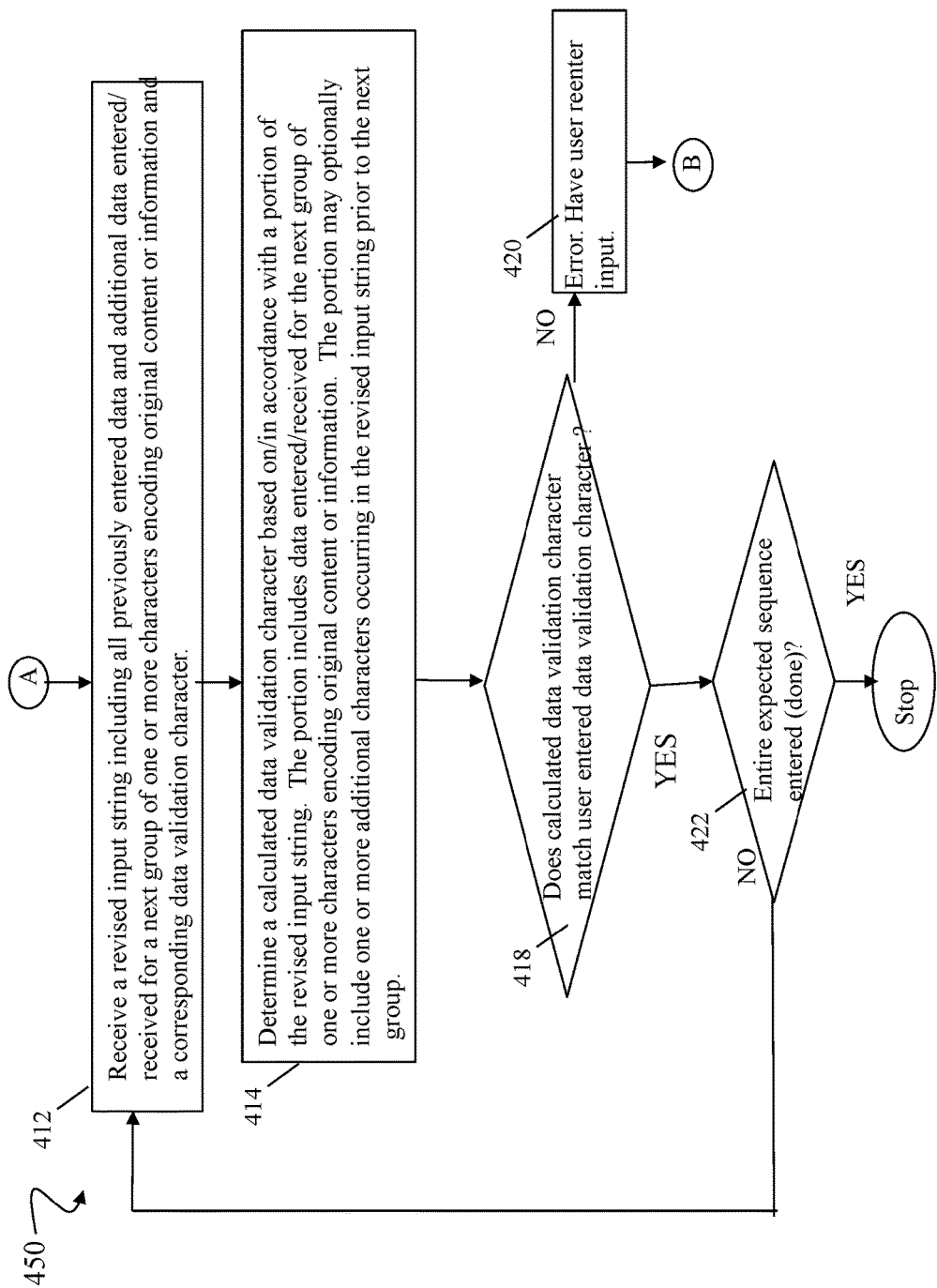

Referring to FIGS. 6 and 7, shown are flowcharts of processing steps that may be performed in an embodiment in accordance with techniques herein. The flowcharts 400 and 450 summarize processing generally described above in connection with a user entering data that is supposed to correspond to a predetermined or an expected sequence of characters. At step 402, a predetermined or expected sequence of characters including characters encoding original content or information and including data validation characters may be determined. The sequence includes groups of characters. Each group includes one or more predetermined characters encoding original content or information followed by a predetermined corresponding one of the data validation characters determined in accordance with a portion of the expected sequence. The corresponding one of the data validation characters may be used in validating the portion of the expected sequence. The portion may include at least the one or more predetermined characters of the group and may optionally include one or more additional characters preceding the group, if any. At step 404, a current input string is received that includes data entered for a first group of one or more characters encoding original content or information and a corresponding data validation character. The current input string may correspond to the user's data entered which is supposed to match the first group of characters of the expected sequence. For example, the current input string includes user entered data that is supposed to match the first group G1 106a as in FIG. 3. At step 406, a calculated data validation character may be determined based on, or in accordance with, first data of the current input string which is supposed to match the one or more characters A1 102a of the first group. At step 408, a determination may be made as to whether the calculated data validation character (as determined in step 406) matches the user entered or received data validation character received in step 404. If step 408 evaluates to no, control proceeds to step 410 where it is determined that a user has incorrectly entered one or more characters of the current input string (e.g., any one or more of characters in the first group G1 106a). In step 410, the user may be prompted to reenter the input string. From step 410, control proceeds to step 404.

If step 408 evaluates to yes, control proceeds to step 412 where a revised input string is received. The revised input string may include all the previously entered data and additional data entered or received for a next group where the data entered is supposed to match characters of the next group including one or more predetermined characters encoding original content or information and a predetermined data validation character of the next group. At step 414, a calculated data validation character may be determined based on, or in accordance with, a portion of the revised input string. The portion includes data entered/received for the next group of one or more characters encoding original content or information. The portion may optionally include one or more additional characters occurring in the revised input string prior to the next group. The portion of the revised input string denotes user entered data which is supposed to match corresponding information or predetermined characters of the next group as included in the expected sequence of characters along with any additional optional characters. At step 418, a determination is made comparing different data validation characters in a manner similar to that as described in connection with step 408. In step 418, a determination may be made as to whether the calculated data validation character (as determined in step 414) matches the user entered or received data validation character for the next group received in step 412. If step 418 evaluates to no, processing proceeds to step 420 where it is determined that a user has incorrectly entered one or more characters of the revised input string (e.g., any one or more of characters in the portion of the revised input string for which the calculated data validation character is determined in step 414). In step 420, the user may be prompted to reenter the input string. From step 420, control proceeds to step 404. If step 418 evaluates to yes, control proceeds to step 422 where a determination is made as to whether data has been entered for the entire expected sequence whereby processing is complete. If step 422 evaluates to yes, processing stops for the expected sequence of characters. If step 422 evaluates to no, processing proceeds to step 412 to incrementally perform data validation in accordance with the next portion of data entered/received which is supposed to match the next group of characters of the predetermined or expected sequence of characters.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing data validation comprising:
determining, using a processor, an expected sequence of characters including a plurality of groups, each of the plurality of groups including a first expected sequence of one or more characters representing encoded information and a second expected sequence of one or more data validation characters determined in accordance with a corresponding portion of the expected sequence, the portion including at least the first expected sequence of one or more characters of said each group, wherein the expected sequence of characters includes a space character between each of the plurality of groups, and wherein, for each of the plurality of groups, the one or more data validation characters of the second expected sequence of said each group is determined using all non-space characters of the expected sequence of characters preceding said each group in the expected sequence of characters and excluding any of the space characters; and performing, using a processor, data validation processing incrementally as data for each of the plurality of groups is received, wherein the data validation processing performed as data for said each group is received uses a received sequence of one or more data validation characters corresponding to the second expected sequence of one or more data validation characters of said each group, wherein performing data validation processing incrementally includes:

receiving a first input string including a first portion corresponding to a first of the plurality of groups, the first portion including a first received data sequence of one or more characters corresponding to the first expected sequence of one or more characters of the first group, the first portion including a first received data validation sequence of one or more data validation characters corresponding to the second expected sequence of one or more data validation characters of the first group;

performing data validation processing for the first input string after receiving the first portion;

receiving a second input string including the first portion and a second portion corresponding to a second of the plurality of groups different from the first group, said first group occurring in the expected sequence prior to the second group, the second portion including a second received data sequence of one or more characters corresponding to the first expected sequence of one or more characters of the second group, the second portion including a second received data validation sequence of one or more data validation characters corresponding to the second expected sequence of one or more data validation characters of the second group; and performing data validation processing for the second input string after receiving the second portion.

2. The method of claim 1,
wherein performing data validation processing for the first input string includes:
determining, in accordance with a data validation algorithm and one or more inputs to the data validation algorithm, a first calculated sequence of one or more data validation characters, the one or more inputs including the first received data sequence; and
determining whether the first received data validation sequence of one or more data validation characters matches the first calculated sequence of one or more data validation characters.

3. The method of claim 2, wherein performing data validation for the first input string includes:
responsive to determining that the first calculated sequence matches the first received data validation character sequence of one or more data validation characters, determining no data validation error for the first input string; and
responsive to determining that the first calculated sequence does not match the first received data validation character sequence of one or more data validation characters, determining a data validation error for the first input string.

4. The method of claim 3, wherein the data validation algorithm is a hash function that determines a first hash value for the first input string.

5. The method of claim 4, wherein the hash function is a cryptographic hash function, and wherein the first hash value is used to determine the first calculated sequence, and wherein the first calculated sequence includes a first character that is a character encoding a number of bits of the first hash value.

6. The method of claim 5, wherein the number of bits denotes a number of bits of information encoded by each character of the first expected sequence of one or more characters of the first group.

7. The method of claim 6, wherein performing data validation for the first input string includes determining whether the first character matches a corresponding character of the first received data validation character sequence of one or more data validation characters.

8. The method of claim 2, wherein the first input string includes a third input string corresponding to other data received at a point in time prior to the first input string, the third input string including one or more characters corresponding to one or more of the plurality of groups other than the first group, the one or more groups occurring in the expected sequence of characters prior to the first group, and wherein the one or more inputs to the data validation algorithm further includes at least one character of the third input string.

9. The method of claim 8, wherein the third input string corresponds to all non-space characters of the expected sequence of characters preceding the first group in the expected sequence of characters.

10. The method of claim 1,
wherein the data validation processing performed for the first input string includes:
determining, in accordance with a data validation algorithm and first one or more inputs to the data validation algorithm, a first calculated sequence of one or more data validation characters, the first one or more inputs including the first received data sequence; and
determining whether the first received data validation sequence of one or more data validation characters matches the first calculated sequence of one or more data validation characters, and
wherein the data validation processing for the second input string includes:
determining, in accordance with the data validation algorithm and second one or more inputs to the data validation algorithm, a second calculated sequence of one or more data validation characters, the second one or more inputs including the first received data sequence and the second received data sequence; and
determining whether the second received data validation sequence of one or more data validation characters matches the second calculated sequence of one or more data validation characters.

11. The method of claim 1, wherein the expected sequence of characters encodes information that is any of a license code, a password, a digital signature, a cryptographic key, and a serial number, and wherein data corresponding to each of the plurality of groups that is received is entered by a user using an input device.

12. The method of claim 11, wherein a user interface performs data validation processing that incrementally performs data validation processing after data is entered for each of the plurality of groups.

13. The method of claim 1, wherein each character in the expected sequence of characters is an encoded character, encoded using an alphabet of characters including letters of the latin alphabet, excluding at least one of "O", "I" and "L".

14. A non-transitory computer readable medium comprising code stored thereon that, when executed, performs a method of data validation comprising:
performing data validation processing incrementally as data corresponding to each of a plurality of groups is received, wherein an expected sequence of characters includes the plurality of groups, each of the plurality of groups including a first expected sequence of one or more characters representing encoded information and a second expected sequence of one or more data validation characters determined in accordance with a corresponding portion of the expected sequence, the portion including at least the first expected sequence of one or more characters of said each group, wherein the expected sequence of characters includes a space character between each of the plurality of groups, and wherein, for each of the plurality of the plurality of groups, the one or more data validation characters of the second expected sequence of said each group is determined using all non-space characters of the expected sequence of characters preceding said each group in the expected sequence of characters and excluding any of the space characters, and wherein the data validation processing performed as data corresponding to said each group is received uses a received sequence of one or more data validation characters corresponding to the second expected sequence of one or more data validation characters of said each group, wherein performing data validation processing incrementally includes:
receiving a first input string including a first portion corresponding to a first of the plurality of groups, the first portion including a first received data sequence of one or more characters corresponding to the first expected sequence of one or more characters of the first group, the first portion including a first received data validation sequence of one or more data validation characters corresponding to the second expected sequence of one or more data validation characters of the first group;
performing data validation processing for the first input string after receiving the first portion;
receiving a second input string including the first portion and a second portion corresponding to a second of the plurality of groups different from the first group, said first group occurring in the expected sequence prior to the second group, the second portion including a second received data sequence of one or more characters corresponding to the first expected sequence of one or more characters of the second group, the second portion including a second received data validation sequence of one or more data validation characters corresponding to the second expected sequence of one or more data validation characters of the second group; and
performing data validation processing for the second input string after receiving the second portion.

15. The non-transitory computer readable medium of claim 14, wherein
the data validation processing performed for the first input string includes:
determining, in accordance with a data validation algorithm, and first one or more inputs to the data validation algorithm, a first calculated sequence of one or more data validation characters, the first one or more inputs including the first received data sequence; and
determining whether the first received data validation sequence of one or more data validation characters matches the first calculated sequence of one or more data validation characters, and
wherein the data validation processing for the second input string includes:
determining, in accordance with the data validation algorithm and second one or more inputs to the data validation algorithm, a second calculated sequence of one or more data validation characters, the second one or more inputs including the first received data sequence and the second received data sequence; and
determining whether the second received data validation sequence of one or more data validation characters matches the second calculated sequence of one or more data validation characters.

16. The non-transitory computer readable medium of claim 14, wherein the expected sequence of characters encodes information that is any of a license code, a password, a digital signature, a cryptographic key, and a serial number, and wherein data corresponding to each of the plurality of groups that is received is entered by a user using an input device.

17. The non-transitory computer readable medium of claim 14, wherein each character in the expected sequence of characters is an encoded character, encoded using an alphabet of characters including letters of the latin alphabet, excluding at least one of "O", "I" and "L".

18. A system comprising:
a processor; and
a memory comprising code stored thereon that, when executed, performs a method of performing data validation comprising:
determining, using a processor, an expected sequence of characters including a plurality of groups, each of the plurality of groups including a first expected sequence of one or more characters representing encoded information and a second expected sequence of one or more data validation characters determined in accordance with a corresponding portion of the expected sequence, the portion including at least the first expected sequence of one or more characters of said each group, wherein the expected sequence of characters includes a space character between each of the plurality of groups, and wherein, for each of the plurality of groups, the one or more data validation characters of the second expected sequence of said each group is determined using all non-space characters of the expected sequence of characters preceding said each group in the expected sequence of characters and excluding any of the space characters; and
performing, using a processor, data validation processing incrementally as data for each of the plurality of groups is received, wherein the data validation processing performed as data for said each group is received uses a received sequence of one or more data validation characters corresponding to the second expected sequence of one or more data validation characters of said each group, wherein performing data validation processing incrementally includes:

receiving a first input string including a first portion corresponding to a first of the plurality of groups, the first portion including a first received data sequence of one or more characters corresponding to the first expected sequence of one or more characters of the first group, the first portion including a first received data validation sequence of one or more data validation characters corresponding to the second expected sequence of one or more data validation characters of the first group;

performing data validation processing for the first input string after receiving the first portion;

receiving a second input string including the first portion and a second portion corresponding to a second of the plurality of groups different from the first group, said first group occurring in the expected sequence prior to the second group, the second portion including a second received data sequence of one or more characters corresponding to the first expected sequence of one or more characters of the second group, the second portion including a second received data validation sequence of one or more data validation characters corresponding to the second expected sequence of one or more data validation characters of the second group; and performing data validation processing for the second input string after receiving the second portion.

* * * * *